(12) United States Patent
Ikeda

(10) Patent No.: US 6,634,097 B1
(45) Date of Patent: *Oct. 21, 2003

(54) AUTOMOBILE ASSEMBLY LINE AND TRANSFERRING SYSTEM

(75) Inventor: Shinichi Ikeda, Mie-ken (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,320

(22) Filed: Apr. 30, 1997

(30) Foreign Application Priority Data

Dec. 13, 1996 (JP) .............................. 8-334218

(51) Int. Cl.[7] ................................ B23P 21/00
(52) U.S. Cl. ............................ 29/783; 29/791; 29/822
(58) Field of Search ................... 29/783, 786, 822, 29/791, 793

(56) References Cited

U.S. PATENT DOCUMENTS

| | | | | | |
|---|---|---|---|---|---|
| 4,793,055 A | * | 12/1988 | Shintani | ........................ | 29/793 |
| 4,827,598 A | * | 5/1989 | Sakamoto et al. | ............ | 29/783 |
| 4,930,213 A | * | 6/1990 | Hayakawa et al. | ............ | 29/793 |
| 4,937,929 A | * | 7/1990 | Nokajima et al. | ............. | 29/430 |
| 5,319,840 A | * | 6/1994 | Yamamoto et al. | ........... | 29/430 |
| 5,513,428 A | * | 5/1996 | Shiramizu et al. | ............ | 29/783 |

FOREIGN PATENT DOCUMENTS

| | | | | | |
|---|---|---|---|---|---|
| DE | 3729084 | * | 3/1989 | .................. | 29/791 |
| EP | 370589 | * | 5/1990 | .................. | 29/791 |
| EP | 0492673 A1 | * | 7/1992 | .................. | 29/822 |
| JP | 7-277239 | | 10/1995 | | |

* cited by examiner

Primary Examiner—Gergory Vidovich
Assistant Examiner—Jermie E. Cozart
(74) Attorney, Agent, or Firm—Liniak, Berenato & White

(57) ABSTRACT

Automobile assembly line comprising a plurality of transferring carriages 4 to place and support the automobiles during a transferring operation, a first transferring circuit including a first closed loop line 5 to carry each transferring carriage, the first transferring line being comprised of many stations where automobile parts are assembled to the automobile body at each station, a plurality of transferring suspension frames 6 under which the automobiles are suspended and supported during transferring operation, a second transferring circuit including a second closed loop line to carry each unit of suspension frames, the second transferring line being comprised of many stations where automobile parts are assembled to the automobile body at each station, and a transferring mechanism to transfer the automobile body from the transferring carriage 4 of the first transferring line to the suspension frames 6 of the second transferring line at one location where the first transferring line and the second transferring line run in parallel upper and lower sides is offered according to the present invention. A small space but effective workers training line, accessory assembling line, production method analyzing line, small scale assembling line, etc. are also offered.

3 Claims, 2 Drawing Sheets

AUTOMOBILE ASSEMBLY LINE AND TRANSFERRING SYSTEM

BACKGROUND OF THE INVENTION

1. Field of the Invention

The present invention relates to an automobile assembly line and transferring system to assemble auto-parts to an automobile body after the automobile body has passed the painting process.

2. Description of the Related Art

In conventional systems, an automobile assembly line utilized following a body painting process comprises a straight automobile body transferring line with a constant transferring speed of the body for mass production of automobiles as prerequisite.

Methods different from the above mentioned automobile assembly line have also been disclosed. For instance, Japanese laid-open patent publication 7-277239 introduces several derivative branch lines in the way of the straight automobile body transferring line, by which same type automobiles are assembled temporally apart from the main assembly line of mixed type automobiles.

For instance, FIG. 2 indicates an automobile assembly line to assemble various auto-parts to the automobile body after the body has passed the painting process. In FIG. 2, reference numeral 31 indicates an instrument panel assembling process. Reference numeral 32 indicates a window glass assembling process, 33 an underslung parts assembling process, 34 an interior finishing process, 35 a tire and door assembling process. The automobile assembly line comprises assembling various auto-parts to an automobile body and transferring such assembled automobile body according to an order of assembling processes of 31, 32, 33, 34, and 35.

The interior finishing process 34 differs greatly according to kinds of automobiles to be assembled. For instance, interior finishing process 34 is separated to three groups according to kinds of automobiles. Each derivative branch line is indicated by reference numerals $34_1$, $34_2$, and $34_3$, respectively.

However, there are pointed out following demerits in conventional automobile assembly line.

(1) Large scale production is a prerequisite for the assembly line. Accordingly, the assembly line does not fit to smaller scale production.

(2) The assembly line requires greater installation cost.

(3) Wider space is required. The assembly line cannot be in smaller spaces.

(4) The assembly line is too large to use as an accessory line to the main assembly line.

SUMMARY OF THE INVENTION

The present invention is made to overcome the problems as described in the foregoing. The present invention comprises a first transferring means of a closed loop line including many automobiles transferring carriages and a second transferring means of a closed loop line including many automobiles suspension frames. The first transferring line and the second transferring line are connected each other at one location where each automobile is tranferable from the first transferring line to the second transferring line, or vice versa. The assembly line according to the present invention can offer a plurality of auto-parts assembling lines and such assembled automobiles transferring lines in small space layouts in the way of main automobile assembly line.

The present invention has been made in view of the foregoing situation. The assembly line according to the present invention comprises a plurality of transferring carriages on which the automobiles are placed and supported during transferring operation, a first transferring means including a first closed loop transferring line to carry each transferring carriage in consecutive order, the first transferring means being comprised of many stations where auto-parts are assembled to the automobile body at each station, a plurality of transferring suspension frames under which the automobiles are suspended and supported during the transferring operation, a second transferring means including a second closed loop transferring line to carry each unit of suspension frames in consecutive order, the second transferring means being comprised of many stations where auto-parts are assembled to the automobile body at each station, and a transferring means to transfer the automobile body from said transferring carriages of the first transferring means to said suspension frames of the second transferring means at least at one location provided where said first transferring line and said second transferring line run in parallel at upper and lower sides.

The automobile assembly line according to the present invention includes an automobile supply station at one place of the first transferring means through which each automobile is transferred to said first transferring means after said automobile body passes the painting process.

The automobile assembly line according to the present invention includes an automobile take-out station at one place of the first transferring means-or the second transferring means through which each automobile is taken out toward a following third transferring means.

The third transferring means is provided following the automobile take-out station. The third transferring line includes auto-parts assembling stations. Auto-parts can be assembled to the automobile body at every station of said third transferring line. All assembled automobiles are taken out from said take-out station of the third transferring means and transferred to an inspection site for assembled automobiles.

The assembly line according to the present invention comprises self-movable transferring carriages of the first transferring means and self-movable suspension type transferring frames units of the second transferring means.

An upper surface of the transferring carriage in the first transferring means is horizontally supported so that workmen may work on it. At least at one location where the first transferring line of the first transferring means and the second transferring line of the second transferring means run in parallel at upper and lower sides, each transferring carriage and each unit of suspension frame run synchronously.

An automobile transferring system according to the present invention comprises a plurality of body transferring operations between the first transferring means including the first transferring line of a loop line to carry a plurality of the transferring carriages and the second transferring means including the second transferring line of a loop line to carry a plurality of the transferring units of suspension frames. Also, the automobile transferring system comprises various short assembly lines selectively combined with an upper surface assembling operation and over head assembling operation.

DETAILED DESCRIPTION OF THE PREFERRED EMBODIMENTS

Figure 1:
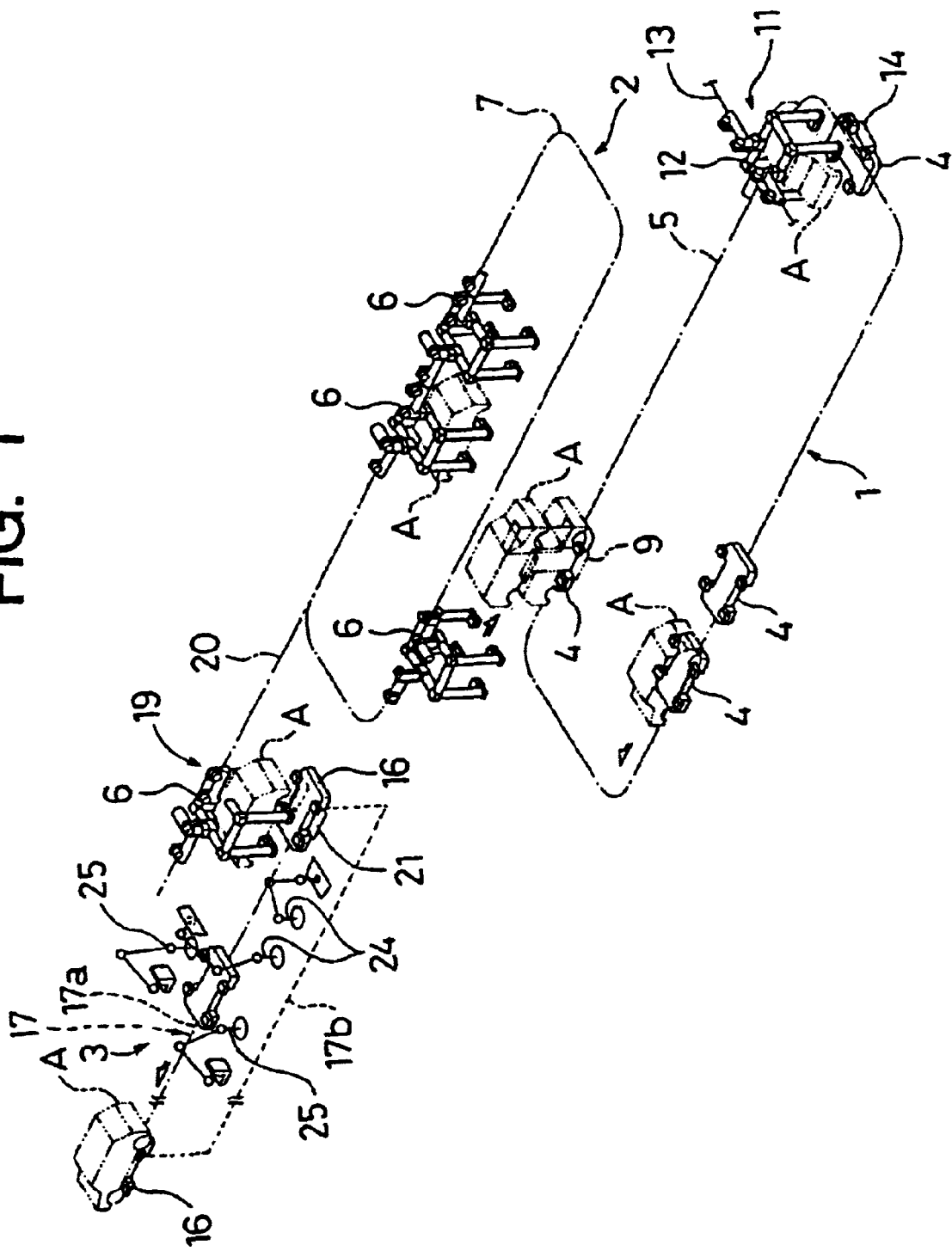
FIG. 1 is a perspective view indicating outline of the automobile assembly line according to the present invention.
Figure 2:
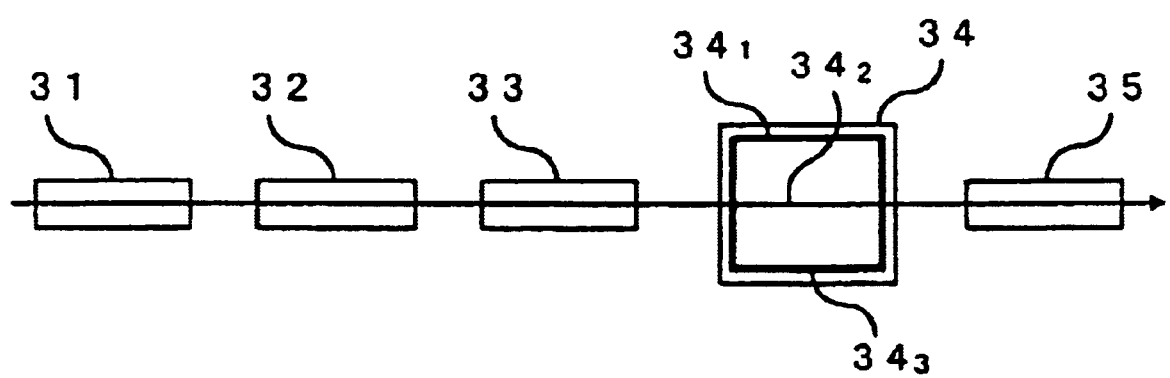
FIG. 2 is a brief plan view of conventional automobile assembly line.

Now the automobile assembly line according to the present invention is explained with accompanied drawing FIG. 1.

In FIG. 1 reference numeral 1 indicates first transferring means, reference letter A indicates automobile's body, reference numeral 4 indicates a first transferring carriage and reference numeral 5 indicates transferring line. The transferring carriage 4 of the first transferring means 1 receives the automobile body A on it. The first transferring means 1 comprises plural numbers of self-movable transferring carriages 4.

The transferring carriages travel by means of a driving means. The rectangular shape transferring line 5 (the first transferring loop line) is provided to consecutively carry the transferring carriages.

The second transferring means 2 supports the body A by means of suspension frames. Said second transferring means 2 comprises plural numbers of self-movable units of suspension frames 6, driven by means of the driving means and a rectangular shape transferring line (the second transferring loop line) 7 to guide the units of suspension frames.

A transferring means is provided at one location where the transferring line 5 of the first transferring means 1 and the transferring line 7 of the second transferring means 2 run in parallel for example at upper side 7A and lower side 5A. The transferring means comprises a first lifter 9 to support and lift up the body A. Said transferring means can transfer the automobile body A between the transferring carriages means 4 and the transferring units of suspension frames 6.

Reference numeral 11 indicates a body supply station. Reference numeral 12 indicates a suspension transferring means and 13 indicates a transferring line. The body supply station is provided at one location where the third transferring line 13 of the suspension transferring means 12 and a straight line of the transferring line 5 of the first transferring means 1 run in parallel at upper side 7A and lower side 5A. The body supply station comprises a second lifter 14 to transfer the body A from the suspension transferring means 12 to the transferring carriage means 4. Construction of the suspension transferring means 12 is the same construction as the construction of the suspension transferring means 6 of the transferring line 2.

Reference numeral 16 indicates a second transferring carriage which is the same construction of the first transferring means 4. Reference numeral 17 indicates an extended straight line to guide the transferring carriages 16. The third transferring means 3 comprises a plurality of the transferring carriages 16, which are the same construction of the transferring carriage means 4 used in the first transferring means 1 and a straight line of the transferring line 17 to guide said transferring carriages 16. Said transferring line 17 comprises an upper transferring line 17a (one way) and a lower transferring line 17b (return way). Said second transferring carriages means 16 is circulable between both ends of said transferring carriages means by means of lifters (not shown in the figure).

Reference numeral 19 indicates an automobile take-out station. Reference numeral 20 indicates a fourth transferring line. The automobile take-out station 19 is provided at one location where the transferring line 20 which is connectable to or detachable from the straight line of the transferring line 7 of the second transferring means 2 and the upper transferring line 17a of the third transferring means 3 run in parallel upper and lower sides. The automobile take-out station 19 comprises a third lifter 21 to support the body A to lift up and down. The body is transferable from the unit of suspension transferring means 6 to the transferring carriage 16. Construction of the lifter 21 is the same construction as construction of the lifter 9 and the lifter 14 of the automobile supply station 11.

Reference numeral 24 indicates a window glass assembling robot and reference numeral 25 indicates a seat assembling robot. There are provided at both sides of the third transferring means 3 plural numbers of auto-parts assembling robots. Namely, window glass assembling robots 24, 24 and seat assembling robots 25, 25.

The transferring line of the first transferring means 1 and the transferring line 7 of the second transferring means 2 run in parallel upper and lower sides at one position. A part of the upper plate of the transferring carriage is horizontally made so that a worker may work on it. At the position where the transferring carriage 4 of the first transferring means 1 and the suspension transferring means 6 of the second transferring means 2 run synchronously. Carriage working station of the transferring carriage 4 and over head working station of the suspension transferring means 6 run synchronously.

Next, practical flow of the body A is explained.

After painting process is finished, the body A is suspended by the suspension transferring means 12 and runs along the transferring line 13 to the body supply station 11. The lifter 14 transfers the body A to the transferring carriage 4 from the suspension transferring means 12.

The transferring carriage means 4 holds the body A and runs along the transferring line 5 of the first transferring means 1 and workers standing by along the transferring line assemble the auto-parts to the body A.

Kinds of auto-parts assembled to the body A differ in first circulation, second circulation and nth turn circulation. After the transferring carriage means 4 circulates several times and when it comes to the lifter 9 the driving means stops the transferring carriage means 4. The lifter 9 lifts up the body A high and transfers said body A to the suspension transferring means 6.

The suspension transferring means 6 suspending and supporting the body A runs along the transferring line 7 of the second transferring means 2. The auto-parts are assembled to the body A through over head working.

In first circulation, second circulation and nth turn circulation, various kinds of auto-parts are assembled to the body A by over head working. When the suspension transferring means 6 arrives at the lifter 9 it stops driving, and the lifter 9 goes up to hold the body A and the suspension transferring means 6 moves and then the lifter 9 comes down to transfer the body A from the suspension transferring line to the transferring carriage means, 4. Auto-parts are assembled to the body A during the transferring carriages being driven.

When the transferring means 4 comes to the position of the lifter 9 to transfer the body A the transferring carriage stops and the body A is transferred to the suspension transferring means 6 of the second transferring means 2.

In such a manner the suspension transferring means 6 circulates in the first transferring means 1 and the second transferring means 2 several times, said suspension transferring means 6 runs along the transferring line 7 and comes to the position where said suspension transferring means 6 is connectable to the transferring line 20, said transferring line 20 is exchanged to connect the transferring line 7 and said suspension transferring means 6 is transferred to the transferring line 20 from the transferring line 7 and runs along the transferring line 20.

When said suspension transferring means 6 comes to the automobile take-out station 19 said suspension transferring means 6 stops and then the lifter 21 goes up to support the body A. Then said suspension transferring means 6 moves and the lifter 21 comes down to transfer the body A to the transferring carriage means 16 of the third transferring means 3. Said transferring carriage means 16 holding the body A is moved along the upper transferring line 17a. The window glass assembling robots 24, 24 assemble the window glasses and the seat assembling robots 25, 25 assemble the seats. Finally, such assembled automobiles are transferred to an inspection process from the transferring carriage means 16.

On the other hand, an empty transferring carriage means 16 is taken down by means of a lifting apparatus (not shown in the figure) to the lower transferring line 17b and travels along said lower transferring line 17b and it is pushed up by means of a lifter (not shown in the figure) to return to the upper transferring line 17a.

(I). When the automobile assembly line according to the present invention is provided apart from the main automobile assembly line the following effects are obtained.

(1) When new parts are considered to be added to the automobile body it is recommended to add a new line according to the present invention and an automobile body is entered into this new line and practically added new parts to inspect adding condition or reconsideration of the order of assembling auto-parts as well as training workers is made.

The automobile assembly line is selectively operated, either automatically or manually. Either of the first transferring means or the second transferring means is selectively operated or stopped.

(2) It is recommended to train an operator who has no working experience in the auto-parts assembly line. Also it is recommended to train an operator in changing working processes.

The automobile assembly line is selectively operated, either automatically or manually. Either of the first transferring means or the second transferring means is selectively operated or stopped.

(3) When a main automobile assembly line is improved or newly added, it is recommended to simulate actual circulation time of the first transferring means and the second transferring means to transfer the automobile body around the assembly line by the automobile assembly line according to the present invention including numbers of circulation, circulation speed and preferable stopping position, etc. Combination of working conditions on the carriages and over head working is also analyzed by this simulation.

(4) When enlargement plan of the main automobile assembly line is expected due to a limited capacity of the existing assembly line, it is possible to correspond actual requirement by applying the assembly line according to the present invention.

(5) It is possible to provide an additional third automobile assembly line in the downstream of the automobile take-out station.

(6) To provide auto-parts assembling robots along the additional third automobile assembly line in the downstream of the automobile take-out station is possible. Training of such auto-parts assembling robots is achieved. Further, when a new kind of automobile is added into the main assembly line, it is recommended to train auto-parts assembling robots by the assembly line according to the present invention.

(II). In a factory of small scale production capacity it is recommendable to utilize the assembly line of the present invention as main automobile assembly line.

In the preferred embodiment of the present invention one location of automobile body transferring means is provided between the first transferring means and the second transferring means. It is further recommended to provide two and three locations in the preferable locations between the first and the second transferring means.

In the aforementioned embodiment the automobile take-out station is provided in the second transferring means but it is not limited to this but said take-out station is provided in the first transferring means.

EFFECTS OF THE INVENTION

By connecting the first transferring carriage means comprising closed loop transferring line and the second suspension type transferring means comprising closed loop transferring line at one location, it becomes possible to plan assembly lines of small space comprising plural numbers of derivative branch assembling processes. Small space, small assembling system and low installation cost are possible. Very effective training line of small space, accessory assembly line, production analysis line, small scale assembly line, etc., become possible.

What is claimed is:

1. An automobile assembly line provided apart from a main long automobile body transferring line for training an operator in processes related to assembling auto-parts comprising:

a plurality of transferring carriages on which at least one automobile body is placed and supported during a transferring operation, a first transferring line including a first closed loop line carrying each of said plurality of transferring carriages in consecutive order and about a first closed loop cycle, a first transferring means including at least one station for transferring and assembling auto-parts to an automobile body, a plurality of transferring suspension frames under which the automobile body is suspended and supported during said transferring operation, a second transferring line including a second closed loop line carrying each of said plurality of suspension frames in consecutive order and about a second closed loop cycle, a second transferring means including at least one station for transferring and assembling auto-parts to the automobile body, and an additional transferring means to transfer the automobile body from one of said plurality of transferring carriages of the first transferring line to one of said plurality of suspension frames of the second transferring line at a location where said second transferring line runs in parallel with and vertically above a lower side of said first transferring line wherein said first transferring means and said second transferring means operate with a plurality of circulation speeds and stopping positions, wherein an automobile take-out station is provided at one location in one of said first and second transferring means, and wherein a third automobile transferring means is provided with a plurality of transferring carriages to receive the automobile body via the automobile take-out station, the third automobile transferring means includes at least one auto-parts assembling station to assemble auto-parts, whereby an assembled automobile body is removed via the take-out station and transferred to an inspection site for said assembled automobile body.

2. The automobile assembly line according to claim 1, wherein said first transferring means and said second transferring means are automated systems adapted to transfer said automobile body between said first transferring means and said second transferring means.

3. The automobile transferring system of claim 1, wherein said additional transferring means provides a single location for transferring the automobile body from the first transferring line to the second transferring line, such that said additional means provides no more than a single common intersection area between said first and second transferring lines.

* * * * *